United States Patent [19]

Schwab et al.

[11] 3,954,915

[45] May 4, 1976

[54] BLOCK COPOLYMERS OF HYDROGENATED DIENE-STYRENE WITH POLYMERIZED ALKYLENE OXIDE AND ALKYLENE SULFIDE

[75] Inventors: Frederick C. Schwab, Metuchen; Israel J. Heilweil, Princeton, both of N.J.

[73] Assignee: Mobil Oil Corporation, New York, N.Y.

[22] Filed: June 24, 1974

[21] Appl. No.: 482,037

Related U.S. Application Data

[63] Continuation-in-part of Ser. No. 387,845, Aug. 13, 1973, Pat. No. 3,867,295.

[52] U.S. Cl. .................. 260/887; 252/33.4; 252/33.6; 252/42.1; 252/47.5; 252/48.6; 252/49.6; 252/51.5 R; 252/52 A; 252/56 R; 260/827; 260/874

[51] Int. Cl.² ................ C08L 9/06; C08L 43/04; C10M 1/40

[58] Field of Search ........................... 260/874, 887

[56] References Cited

UNITED STATES PATENTS

| | | | |
|---|---|---|---|
| 3,050,511 | 8/1962 | Szwarc | 260/93.5 A |
| 3,219,725 | 11/1965 | Kirkland et al. | 260/874 |
| 3,404,092 | 10/1968 | Jacobson et al. | 252/51.5 R |
| 3,640,971 | 2/1972 | Katayama et al. | 260/874 |
| 3,766,300 | 10/1973 | De La Mare | 260/879 |
| 3,791,971 | 2/1974 | Lowe | 252/51.5 A |
| 3,792,005 | 2/1974 | Harlan | 260/887 |
| 3,836,600 | 9/1974 | Brewbaker et al. | 260/874 |

*Primary Examiner*—Murray Tillman
*Assistant Examiner*—Thurman K. Page
*Attorney, Agent, or Firm*—Charles A. Huggett; Raymond W. Barclay; Claude E. Setliff

[57] ABSTRACT

Novel block copolymers containing at least two segments, in which segment A is either a polymerized alkyl-substituted styrene, the alkyl group having at least 3 carbon atoms, or a hydrogenated block of random butadiene-styrene copolymer and from 1 to about 50% by weight of segment B being an alkylene oxide or sulfide copolymerized with the first segment as an AB or BAB copolymer, perform as multifunctional additives in industrial organic compositions, both hydrocarbon fluids, such as petroleum-derived, and non-hydrocarbon, or synthetic fluids, providing such utility as detergency and viscosity index improvement. These copolymers have molecular weights in the range of from about 1,000 to 300,000. The copolymers are particularly useful in lubricating oils, greases and fuels, especially cross-graded lubricants, Diesel oils, gasoline and fuel oils. Copolymers capped with metal diisocyanate have excellent thermal and oxidative stability.

13 Claims, No Drawings

BLOCK COPOLYMERS OF HYDROGENATED DIENE-STYRENE WITH POLYMERIZED ALKYLENE OXIDE AND ALKYLENE SULFIDE

CROSS-REFERENCE TO RELATED APPLICATIONS

This applicaton is a continuation-in-part of application U.S. Pat. Ser. No. 387,845, filed on Aug. 13, 1973, and now U.S. Pat. No. 3,867,295.

BACKGROUND OF THE INVENTION

1. Field of the Invention

This invention relates to "block copolymers" suitable for use in organic fluid compositions. In particular, this invention relates to block copolymers composed of at least two blocks and fluid compositions containing the same.

2. Description of the Prior Art

U.S. Pat. No. 3,050,511 describes block copolymers obtained from polystyrene and alkylene oxide. The technique involves forming a "living polymer" of the styrene in the presence of an anionic catalyst, then adding the alkylene oxide to it. Such products, however, would not be suitable as hydrocarbon fluid additives and lack suitable terminal groups for thermal and oxidative stability. They would have insufficient solubility in lubricating oils during use to retain their effectiveness. U.S. Pat. No. 3,219,725 describes block polymer of oxymethylene and styrene or alpha-methylstyrene by polymerizing styrene and adding formaldehyde to produce a polyoxymethylene block. It is understood that the resulting block copolymer may be terminated by esterification. Olefin oxide, higher aldehydes, isocyanates and the like may replace the styrene. Again, the use of styrene polymer as the first block-forming monomer or replacement by a polar monomer would not produce a useful multifunctional additive for lubricating oils. U.S. Pat. No. 3,281,499 describes block copolymers of oxymethylene and olefins, such as styrene. The resulting products are moldable polymers which are of little solubility in lubricating oils or other organic fluids. U.S. Pat. No. 3,318,813 describes a tert-butylstyrene polymer prepared in an anionic polymerization using n-butyl lithium as the initiator. Polymerization is terminated in methanol. This polymer is said to be useful as a viscosity index (VI) improver. The polymers used in this reference contain no polar groups. Hence, these homopolymers are distinguishable from the copolymers of the present invention. U.S. Pat. No. 3,175,997 claims a process of preparing terminally reactive polymers, such as butadiene-styrene copolymers, by reacting with ethylene oxide and acidifying the alkali metal group to -OH. The products are used in adhesives, potting compounds and binders. U.S. Pat. No. 2,835,658 describes treating styrene-lactone block polymers with diisocyanates. The polymers are elastomers prepared from free-radical bulk polymerization. G.B. Pat. No. 1,304,289 describes hydrogenated butadiene-styrene copolymers as VI improvers. These polymers contain no polar polymer blocks.

SUMMARY OF THE INVENTION

Applicants have now discovered novel block copolymers of the AB or BAB type, wherein A is a block of either a polymer of alkylstyrene having at least one alkyl group attached to the nucleus containing at least 3 carbon atoms or a hydrogenated copolymer of a diene and styrene or alkylstyrene, and B is a block of a polymer of poly(alkyleneoxide) or poly(alkylene sulfide), wherein the B block may constitute at least 1 or 1% to about 50% by weight of the copolymer. These copolymers may contain end groups, Z, derived from an organic or inorganic compound capable of reacting with an alkoxide or alcohol. Z may thus be hydroxy, alkoxy, metaloxy of the alkali metal series, carboxylate, sulfonate, carbamate, isocyanate, diisocyanate, halocarbonyl or heterocyclic nitrogen or oxygen. Organic industrial fluid compositions containing such polymers have improved combined detergent and viscosity index characteristics. Lubricants such as automotive lubricating oils, Diesel oils, cross-graded oils and greases, and fuels, such as gasoline and fuel oil, are suitable media for these polymers.

DESCRIPTION OF SPECIFIC EMBODIMENTS

The copolymers prepared from the alkylstyrene or hydrogenated diene-styrene polymers and the polyalkylene oxide or sulfide are generally of the AB or BAB types. Included in the BAB category are also

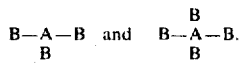

In the first step of producing the copolymers of this invention, an alkyl styrene or a mixture of preferably butadiene and styrene is polymerized by anionic polymerization to form the A polymer. The initiator for this reaction is an organometal compound of the alkali metal group: lithium, sodium, potassium, cesium and rubidium. The formula for these initiators is $RM_y$, wherein R is organo, mono- or polyvalent and may be alkyl, alkenyl, aryl, aralkyl, and alkaryl, and may contain from 1 to about 50 carbon atoms; and y is 1 to 4, and preferably 1 or 2. Such initiators as methyl lithium, ethyl lithium, methyl sodium, propyl lithium, n-butyl lithium, sec-butyl lithium, tert-butyl lithium, butyl sodium, lithium naphthalene, sodium naphthalene, potassium naphthalene, cesium naphthalene, phenyl sodium, phenyl lithium, benzyl lithium, cumyl sodium, cumyl potassium, methyl potassium, ethyl potassium, and so forth may be used in this reaction. Also, metal initiators containing a dianion, such as the alkali metal salts of 1,1-diphenylethylene and alpha-methylstyrene tetramer and the radical anion initiators of the sodium naphthalene type, could lead to the formation of the BAB copolymer. Preparation of

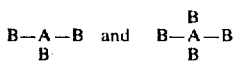

copolymers may be achieved through multifunctional initiators, for example 1,3,5-trilithiocyclohexane and 1,4,7,10-tetrapotassiodecane. It is understood in anionic polymerization that each molecule of the initiator starts one anionic polymer chain; it is also understood that a multiple anion can permit addition of a second polar block on the A polymer.

The anionic polymerization reaction is carried out in the presence of either a polar or nonpolar solvent. Suitable solvents include hexane, heptane, octane, benzene, toluene, xylene, tetrahydrofuran, ethyl ether, methyl ethyl ether, 1,4-dioxane, and other alkanes, ethers and aromatic solvents, oils and mixtures thereof. Tetrahydrofuran is the preferred solvent, since it is an excellent solvent for both polymerizaton steps in this invention.

In the preparation of the poly(alkylstyrene), block A, the alkylstyrene is dissolved in solvent and polymerized in the presence of from $10^{-1}$ to $10^{-4}$ mole of anionic initiator per 100 grams of the alkylstyrene. The alkylstyrenes useful in this phase of the invention include propylstyrene, n-butylstyrene, i-butylstyrene, t-butylstyrene, n-amylstyrene, i-amylstyrene, hexylstyrenes, heptylstyrenes, methylpropylstyrene, methylbutylstyrene and the like. The butylstyrenes are most preferred. Mixtures of different alkylstyrenes or an alkylstyrene with styrene may also be used, preferably in a ratio to provide an average of at least 2 carbon atoms of the alkyl substituent per nucleus. Polymerization is carried out for sufficient period of time to provide a block of poly(alkylstyrene) until no further polymerization occurs. Molecular weights in this first step may range from 1,000 to over 250,000. The final group on the living polymer consists of -OM derived from the organometal initiator. It is understood that this group permits addition of the polar block B in the subsequent polymerization step. The term "living polymer" is meant to indicate that the polymerization reaction involving the alkylstyrene (and also the diene-styrene copolymer) has no termination step and may continue until no further monomer remains. One polymer chain starts with each equivalent of the initiator and uses up available monomer until depletion thereof. Control of molecular weight is achieved by adjustment of styrene/initiator ratio.

The presence of the alkyl group on the styrene is believed to permit adequate solubility of the final resulting copolymer in petroleum-base or hydrocarbon or non-hydrocarbon or synthetic fuels and lubricants. The diene-styrene and dienealkylstyrene copolymers also possess the desirable solubility in petroleum and other industrial fluids and may be used as block A. Such dienes as preferably butadiene and isoprene, and also 2,3-dimethylbutadiene, 2,3-diphenylbutadiene, and others of the structure

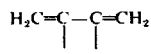

the dangling valences being substituted by hydrogen or alkyl or aryl groups of $C_1$ to $C_{10}$, and styrene or the aforementioned alkylstyrenes provide suitable copolymers in this aspect of the invention.

To illustrate the polymerization of the diene and styrene copolymers, the following description will refer to the butadiene-styrene system as representative of this aspect of the invention. This polymerization may be carried out either in a random or a block polymerization. The random copolymer is preferred in this invention. For this purpose, a randomizing agent is added to the polymerization reaction mixture. Suitable randomizers include: ethers, such as diethylether, dimethoxyethane, bis(2-methoxyethylether), 1,2bis(methoxyethoxy)ethane and tetrahydrofuran. Other randomizing agents include the alkali metal salts of $C_1$ to $C_{20}$ alcohols or phenols, e.g.: potassium t-butoxide or potassium t-amyloxide. Other agents are phosphite triesters, such as tributyl phosphite, tri-substituted triazines, dimethyl pyridine, potassium acetonyl or potassium or sodium metals.

Upon completion of the polymerization of the butadiene and styrene, since there are vinyl groups remaining in the molecule which could become oxidized or susceptible to other forms of deterioration during use, it is desirable to terminate the initial copolymerization by adding a small amount of the polar compound of block B, such as ethylene oxide, followed by a small amount of a mineral acid or acetic acid and subjecting it to hydrogenation or by hydrogenating first and then acidifying. In the scope of this invention hydrogenation, following the complete addition of the polar block, such as that of ethylene oxide, is also contemplated.

Hydrogenation is carried out in the presence of a heterogeneous or homogeneous hydrogenation catalyst. Heterogeneous catalysts include metals of the platinum series, e.g. platinum, palladium and the like, iron, cobalt, or nickel, particularly Raney nickel. The catalyst metals may be used alone or on a carrier, such as charcoal, silica, alumina and the like. Homogeneous catalysts include organic salts of these metals, such as nickel acetylacetonate, nickel diisopropylsalicylate, nickel naphthenate, nickel octoate, and nickel ethyl hexanoate. Homogeneous catalysts also include tris(triphenyl)phosphine rhodium chloride and other group VIII metal compounds, particularly a compound obtained by reacting an aluminum trialkyl with a nickel or cobalt organic salt, such as aluminum triisobutyl with nickel naphthenate or 2-ethylhexanoate.

The units of butadiene and styrene in the first block may contain from 5 to 70% styrene units based on the total number of units of butadiene and styrene together; most preferably between 20 and 60% styrene is present. The hydrogenation catalyst is present in the amount of from about 0.0005 to about 10% by weight of the polymers, preferably 0.005 to about 5%. The lower concentrations are desirable for homogeneous catalysts; the upper limits are for heterogeneous catalysts. U.S. Pat. No. 3,294,768 discloses a number of catalysts useful in forming random butadiene-styrene adducts and are similar to the aforementioned initiators of the $RM_y$ formula.

The next step in formation of the block copolymers of this invention is to react block A polymer, either the poly(alkylstyrene) or (PAS) or the hydrogenated butadienestyrene copolymer or (HBDS), with the polar compound. In the first case, the alkylene oxide or sulfide is added directly to the PAS solution. In the latter case the HBDS copolymer is preferably retained in the hydrogenated reaction mass, although it may be separated therefrom and redissolved in a solvent. A catalyst for the alkylene oxide polymerization is added to the HBDS solution. Such catalysts include: potassium t-butoxide, potassium t-amyloxide, potassium hydroxide. The number of moles of catalyst would be approximately the same as that used for the anionic initiator. The alkylene oxide is then added to the HBDS solution. The amount of alkylene oxide added to the solution is from 1 to 50%, and preferably from 5 to 25%, by weight of the polymer. Ethylene oxide is the most preferred monomer for reasons of cost, availability and performance characteristics. The carbon atoms attached to the oxygen atom are vicinal and each of these carbon atoms may be substituted by other carbon atoms, the total number of carbon atoms preferably ranging from 2 to 5. Therefore, also suitable would be 1,2-propylene oxide and 1,2-butylene or 2,3-butylene oxides and the like or their mixtures. Also of interest are diepoxides such as the methylene-bis(phenols).

The living PAS polymer or HBDS copolymer is reacted with the polar compound which adds oxyalkylene or thioalkylene groups at the metaloxy or metalthio terminus, —CH$_2$—CH$_2$—OM or —CH$_2$—CH$_2$—SM, to provide AB block copolymers having at least 2 and up to about 3,500 such polar groups.

Schematic structures may be illustrated as follows:

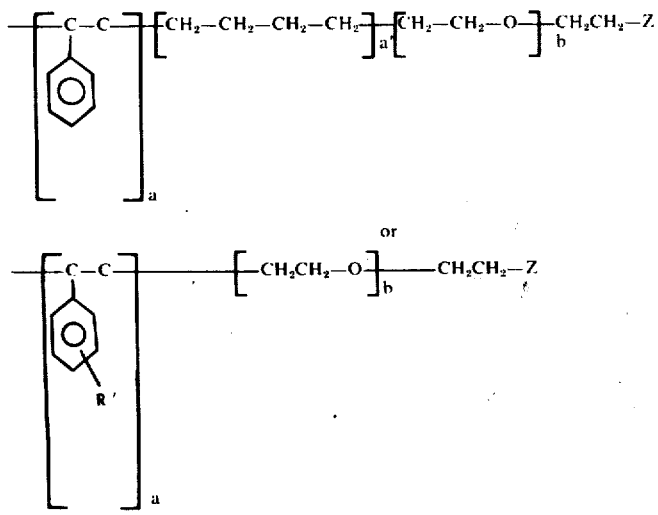

R' being an alkyl group of at least 3 carbon atoms and preferably from 3 to 20, $a$, $a'$ and $b$ are integers of at least 2 and Z is the capping group. Thus, the block copolymers of the invention consist essentially of polymerized styrene-type block having an average molecular weight of between 1,000 to about 300,000 and a polar portion, preferably polypoxyalkylene, having from 2 up to about 3,500 units, preferably 10 to 1,000 units. Preferred molecular weights of the copolymer of this invention may range from about 1,000 to about 300,000 and preferably from 10,000 to about 200,000.

The polar block B may, if desired, be terminated either by precipitating the copolymer in a lower alkyl alcohol, i.e. from 1 to 5 carbon atoms, such as methanol, or by reacting with a compound containing a carbonyl group, such as an organic acid, an isocyanate or a carbonyl halide, such as cyanuric chloride and phosgene, and then either precipitating the resulting reacted polymer or, by our preferred method of replacing the solvent (other than oil) with an oil including petroleum or synthetic oil, e.g. ester, ethers, polyolefins, etc. The end or capping group, Z above, may be hydroxy, metaloxy of the alkali metals, or —OR'' or

R'' being alkyl or aryl of from 1 to 10 carbon atoms or a heterocyclic nitrogen group of pyridines, pyrimidines or triazines. The preferred capping group is prepared by reacting the polymer with an isocyanate, alkyl isocyanate or preferably an aromatic diisocyanate, such as toluene diisocyanate (TDI), to form the mono- or the diisocyanate, or urethane-type, group

at the end of the block copolymer, wherein R''' may be alkyl or aryl and may contain an O=C=N— group, such as phenyl, tolyl, phenylene isocyanate or tolylene isocyanate. With the preferred diisocyanate, the second O=C=N— group may either remain unreacted or reacted with other compounds, such as antioxidants derived frm phenol or aryl amines, or may even be used to cap a second copolymer chain, for example AB-TDI-BA. This cap provides unusually excellent thermal and oxidative stability to the polymer during use. It is usually in the form of an anion with the alkali metal of the initiator,

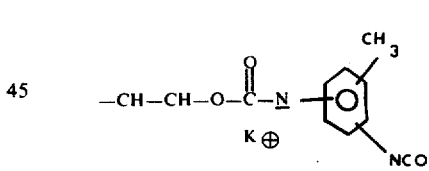

using potassium as the preferred example. Other capping groups consist of hydroxy or metaloxy derived from the metal of the anionic initiator, or another metal substituted by exchange reaction, or from cyanuric halide, dihalopyrimidine, halopyridine, and the like or halocarbonyl. These polyfunctional capping agents may also couple more than one AB polymer molecule, as TDI above.

The styrene polymerization reaction may be conducted at a temperature in the range of from —80° to 100°C., but ordinarily room temperature is the desired maximum. The reaction may be terminated within a period of from 15 minutes to over about 4 hours. The second reaction with alkylene oxide or sulfide may be conducted at a temperature of from 0° up to about 175°C., and the time of reaction may range from about half an hour to about 24 hours. The products are removed by filtering the precipitated copolymer from the solvent or as preferred by adding a hydrocarbon oil (in which the copolymer can be used) or a process oil and removing the more volatile solvent by strippiing or other known means. Should a capping group other than —OM be desired, the reactant providing the group is added to the reaction mixture prior to such separation and the mixture is heated. For example, as previously discussed, the addition of toluene diisocyanate to the reaction product would yield a TDIK end group (wherein M is potassium). Any metal halide or oxide side product resulting from the capping reaction may be removed by washing and/or filtration. In the scope of this invention, the retention of metals may be preferable.

The products of this invention are multifunctional additives for industrial organic fluids. Because of the high molecular weight and narrow molecular weight distribution of these copolymers, they provide high viscosity index and shear stable oil compositions which may perform as cross-graded lubricants, Diesel oils and greases. Thus, the oil compositions of this invention may be used both under high and low temperature conditions, since the higher the viscosity index the more stable the viscosity flow at extreme temperatures. One of the drawbacks of using certain polymers, such as polymethacrylates, as viscosity index improvers is that under the shearing conditions in an engine, the polymer chains may be destroyed resulting in lower viscosities, and possible breakdown of the additive package in oil. Serious viscosity loss may cause the engine to work inefficiently. It has been surprisingly discovered that the block copolymers of this invention have minimal loss in shear stability. It is preferred that the molecular weight distribution (Mw/Mn), wherein Mw is the weight average molecular weight and Mn is the number average molecular weight, be in the range of 1 to 5 and preferably 1 to 2. The block copolymers of this invention having such low Mw/Mn ratio may be readily prepared.

Another valuable function performed by copolymers of this invention, both high and low molecular weight copolymers, is their ability to disperse particles in the lubricant and to prevent them from becoming deposited on engine surfaces. It is believed that the combination of oil soluble and polar portions of the macromolecule permits the polymer both to remain dissolved in the oil and yet hold particles dispersed in the oil. These two characteristics are necessary to keep the oil free of deposits affecting engine performance. Mixed copolymers of different molecular weights or of different A blocks in the fluid medium may be used for a variety of functions.

While these copolymer additives are useful as detergents in organic fluids, they also can thicken the base fluid medium. Of particular interest are gasoline and fuel oil which would have improved detergency as well as lower fuel consumption.

The additives of this invention may be used in conjunction with other additives normally used in lubricants and fuels, such as basic alkali or alkaline earth metal sulfonates and phenates, $C_{20}$ – 300 alkenylsuccinic acid imides of ethylene polyamines, such as tetraethylene pentamine, esters of mono and polyhydric alcohols, such as pentaerythritol, the polymethacrylates, sulfurized olefins such as isobutylene, and phosphites, dithiophosphates, carbamates and the like.

The following examples illustrate the manner of preparing the block copolymers of this invention and the evaluation of such copolymers in organic industrial liquid compositions. The molecular weight measurements given in these examples were obtained by gel permeation chromatography in tetrahydrofuran.

EXAMPLES

EXAMPLE 1

Into a 2,000-ml 4-necked flask was distilled 1000 ml of dried tetrahydrofuran (THF) under vacuum at −78°C. Nitrogen gas was passed through the reactor. The THF was treated with about 30 drops of 0.5 M solution of cumyl potassium in THF. Then 6.6 ml of the 0.5 M cumyl potassium solution were added to the reactor. To the solution was added 80 grams (0.5 mole) of t-butylstyrene through a dropping funnel at −78°C. The polymerization was allowed to proceed at this temperature for approximately one hour. To the resulting reaction mixture was added 20 grams (0.45 mole) of ethylene oxide which had been dried over calcium hydride. The reaction mixture was allowed to react without temperature control and proceed at room temperature for 16 hours. The reaction was terminated by adding to the resulting copolymer 2 ml of methanol and the solvent was replaced by a process oil. The product is an AB block polymer having the following characteristics:

$M_n = 20,850$ $M_w = 28,040$ $M_w/M_n = 1.35$

EXAMPLE 2

Using a procedure similar to that of Example 1, t-butylstyrene and ethylene oxide were copolymerized to form an AB block polymer, except that 40 grams (0.25 mole) of t-butylstyrene was polymerized in the presence of 8.5 ml of 0.6 M cumyl potassium solution in THF and 10 grams (0.227 mole) of ethylene oxide was copolymerized with it. The block copolymer has the following characteristics:

$M_n = 5,700$ $M_w = 6,800$ $M_w/M_n = 1.2$

It should be noted that the difference in molecular weights between the copolymer of Example 1 and that of Example 2 is due to the higher ratio of monomer to initiator in the first example. The lower ratio copolymer would indicate the formation of more short chains and hence, the lower molecular weight. Copolymers having specific desired properties may be produced by controlling this ratio and the ratio between the oleophilic and polar monomers.

EXAMPLE 3

Into a 2,000-ml flask, 300 ml of hexane was added under a nitrogen blanket. Into the flask was distilled under vacuum at −78°C. 150 grams (2.5 moles) of purified butadiene followed by a solution of 50 grams (0.48 mole) of styrene in 800 ml of benzene. The reaction flask, still under a nitrogen blanket, was allowed to warm to room temperature. To the reaction flask was then added 100 ml of a 0.31 M solution of n-butyl lithium containing 0.384 grams of potassium t-butoxide. The reaction flask was maintained at room temperature for 16 hours following this addition during which time polymerization occurred. The polymerization was terminated by the addition of 0.6 gram of ethylene oxide and 2 ml of glacial acetic acid, and the polymer was removed by filtration.

A solution of 105 grams of the resulting polymer in 370 ml of benzene was subjected to hydrogenation by adding 15 grams of a catalyst consisting of 10% by weight of palladium on charcoal and passing hydrogen gas through the reactor at 80°C. and 400 psi for sixteen hours. The catalyst was filtered off from the polymer solution. To the filtrate was added 0.704 gram of potassium t-butoxide under a nitrogen blanket and the solution was heated to reflux; 40 ml of benzene was distilled off. To the resulting solution was added 18 grams (0.4 mole) of ethylene oxide by distilling in the ethylene oxide under vacuum. A nitrogen atmosphere was then applied, and the reaction allowed to proceed at 78°C. for five hours. After polymerization of the ethylene oxide was completed, 70 grams of a process oil was added and the benzene stripped off under vacuum.

The resulting polymer now in the oil solution had the following properties:

$M_n = 3,100$ $M_w = 19,100$ $M_w/M_n = 6.2$

EXAMPLE 4

Using a procedure similar to that of Example 1, except that the amount of ethylene oxide added was only 10% of total monomers instead of 20%, the final copolymer product was reacted with 2 ml of acetic acid. The end group of the copolymer is understood to be —$CH_2CH_2OH$, while those for Examples 1 and 2 have end groups of —$CH_2CH_2OK$. The molecular weight analysis is as follows:

$M_n = 5,800$ $M_w = 6,600$ $M_w/M_n = 1.1$

EXAMPLE 5

A copolymer was prepared using the same procedure as in Example 1, except that only 10% of the ethylene oxide based on total monomers was used. To the resulting polymer solution was added 0.9 gram (6 × 10$^{-3}$ mole) of toluene diisocyanate (TDI) at a temperature of 25°C. The end group in this polymer consists of diisocyanate-potassium group having a free isocyanate group. The molecular weight analysis of the product is as follows:

$M_n = 9,300$ $M_w = 15,800$ $M_w/M_n = 1.7$

EXAMPLE 6

A copolymer prepared by using the procedure of Example 1 (with 10% oxide) was reacted with 0.93 gram (5 × 10$^{-3}$ mole) of cyanuric chloride, leaving a triazinyl end group. The molecular weight analysis is as follows:

$M_n = 7,600$ $M_w = 10,100$ $M_w/M_n = 1.3$

EXAMPLE 7

A copolymer prepared as in the method of Example 1 having an OK end group was reacted with amino dichloropyrimidine leaving an amino-pyrimidinyl end group. The molecular weight analysis is as follows:

$M_n = 6,500$ $M_w = 9,700$ $M_w/M_n = 1.5$

EXAMPLE 8

Another copolymer prepared as in the process of Example 1 was reacted with trimethoxysilane, leaving the following end group:

—O—Si—(OCH$_3$)$_3$

The molecular weight analysis is as follows:

$M_n = 7,100$ $M_w = 10,700$ $M_w/M_n = 1.5$

EXAMPLE 9 a. Into a 5 l. flask was added 3000 ml. of dry cyclohexane and 290 ml. of styrene. A quantity of 487 gms. of purified butadiene was distilled into the flask at −78°C. The reactor was warmed to room temperature and 0.20 gm. of potassium t-butoxide was added and dissolved, at which time 11.5 ml. of 1.31 N sec-butyllithium was added and the reaction allowed to proceed for about 4 hours at 100°F. and about 16 hours at ambient temperature. The polymerization was terminated by the addition of a small amount of gaseous ethylene oxide.

The resulting polymer solution was diluted with an additional 2000 ml. of cyclohexane and hydrogenated at 300 psi. and 40°C. for 24 hours using a nickel acetoacetonate/triethylaluminum catalyst at a ratio of 2/1 Al/Ni. After the hydrogenation is complete, a quantity of 50 ml. of concentrated HCl in 25 ml. methanol was added to the cyclohexane solution and stirred for 2 hours. The polymer was then separated by precipitation into methanol and dried.

b. A quantity of 99 gm. of the dried hydrogenated polymer was dissolved in 1100 ml. of benzene in a 2 l. reactor. About 700 ml. of benzene was distilled off and 0.32 gm. of potassium t-butoxide was added and dissolved. Fifty (50) additional ml. of benzene was then distilled off after heating at 70°C. for 1 hour. A quantity of 24.7 ml. of purified ethylene oxide was added and the reaction allowed to proceed for 5 hours at reflux temperature. The reactor was cooled to 100°F. and reaction was run for an additional 16 hours. At the end of this time, 3.0 ml. of toluene diisocyanate was added. The resulting polymer had the following properties:

$M_n = 65,000$ $M_w = 114,000$ $M_w/M_n = 1.8$

EXAMPLE 10

Into a 12 l. flask was charged 7,200 ml. cyclohexane, 696 ml. of styrene and 1,575 ml. of butadiene. A quantity of 14.4 ml. of tetrahydrofuran (THF) was added and the polymerization initiated with 31.3 ml. of 1.17 N sec-butyllithium and the reaction allowed to proceed for 2 hours at 120°F. The polymerization was terminated by the addition of 37 ml. of a 10% by weight ethylene oxide in cyclohexane solution. A quantity of 2.2 ml. of acetic acid was then added.

The resulting polymer solution was diluted with additional cyclohexane and hydrogenated using a nickel on Kieselguhr catalyst at a temperature of 310°F. and a pressure of 500 psi. for 10 hours. The catalyst was removed by filtration after the hydrogenation was complete.

The polymer solution was then returned to a 12 l. flask and 4 l. of cyclohexane was distilled off and replaced with 5 l. of benzene. A quantity of 14 ml. of a 17.8% by weight solution of potassium t-amyloxide in cyclohexane was added and 1 l. of solvent was removed by distillation. Ethyleneoxide (208 ml.) was added and the reaction allowed to proceed for 10 hours at reflux temperature. The reaction was terminated with 3.0 ml of toluene diisocyanate dissolved in 20 ml benzene. The resulting polymer had the following properties:

$M_n = 65,030$ $M_w = 124,700$ $M_w/M_n = 1.9$

EVALUATION OF PRODUCTS

The products of this invention evidence properties of viscosity index improvement accompanied by excellent shear stability and surprising detergency in both bench and engine testing. The tests used to demonstrate these properties are the shear stability test and measurement of thickening power and carbon removal tests and deposit formation tests. The base media are lubricating oils, Diesel oils and gasoline.

VISCOSITY CONTROL

To indicate the shear stability of the oil compositions of this invention, oil formulations are subjected to a series of shearing forces and the viscosity is measured after each shearing period, or pass. A shear stable formulation will evidence little or no loss in viscosity.

The conditions of the shear stability test are as follows: About 250 cc. of the test oil formulation of known viscosity is passed through a standard Diesel engine fuel injector 10 times and the final viscosity is measured. The injector contains 7 orifices of 0.006-inch diameter each. The test is run at ambient temperature at about 40,000 to 50,000 psig.

The results of these tests on a solvent refined oil containing the block polymers of this invention are tabulated below. In these tables, the polymers are referred to by the following shortened terms: TBS-EO, t-butyl styrene/ethylene oxide copolymer; HBDS-EO, hydrogenated butadiene-styrene/ethylene oxide copolymer; OK, oxypotassium end-group; TDIK, toluene diisocyanate-potassium end-group; OH, hydroxy end-group. Other terms referred to are: VI, viscosity index; MW, molecular weight; SSI, shear stability index (see Rohm and Haas Company Bulletin "Acryloid 700 Series," Sept., 1970) which is calculated by $[(v_1 - v_f/(v_1 - v_o)] \times 100$, wherein $v_1$ is initial viscosity of the formulation, $v_f$ is viscosity after the test, $v_o$ is viscosity of oil formulation without the viscosity improving additive, the lower the number the more effective the additive; and TP, thickening power or increase in viscosity at 210°F. per weight percent of additive.

TABLE I

| Test No. | Polymer/MW | Conc. % by wt. | VI | SSI%* | TP |
|---|---|---|---|---|---|
| 1 | none**/-- | — | 100 | — | — |
| 2 | TBS-EO-TDIK/28,000 | 5.0 | 178 | 5 to 10 | 1.43 |
| 3 | TBS-EO-OH/60,000 | 5.0 | 220 | −9 | 6.03 |
| 4 | HBDS-EO-OK/100,000 | 5.0 | 169 | 0 | 8.66 |
| 5 | HBDS-EO-TDIK/63,000 | 4.0 | 168 | −7 | 6.3 |
| comp. | Butadiene-Styrene Copolymer/70,000 | 3.5 | 148 | 6.2 | 3.4 |

*Negative numbers indicate 0% SSI.
**The base oil is a blend of solvent-refined lubricants used in producing 10W-50 oils. No other additives are present.

TABLE II

| Test No. | Polymer/MW | Conc. % by wt. | VI | SSI%* |
|---|---|---|---|---|
| 1 | Oil Formulation**/-- | 0 | 100 | — |
| 2 | TBS-EO-OH/60,000 | 6.0 | 240 | 18 |
| 3 | HBDS-EO-TDIK/100,000 | 4.0 | 170 | −3 |
| 4 | HBDS-EO-TDIK/74,000 | 5.0 | 158 | 3 |
| 5 | TBS-EO-TDIK/30,000 | 3.0 | 132 | 1 |
| 6 | Polymethacrylate Copolymer/about 100,000 | 8.8 | 184 | 36 |

*Negative number indicates 0% SSI.
**Oil contains about 6% of other additives.

The products of Examples 9(a), the hydrogenated butadiene-styrene (HBDS) copolymer, and 9(b), the block copolymer terminating in TDIK (HBDS-EO-TDIK), were both tested for viscosity changes based on the temperature. Two samples of the oil formulation similar to that tested in Table II each containing 3% by weight of 9(a) copolymer and 9(b) copolymer were heated and the viscosity was measured at various temperature levels. The results were as follows:

TABLE III

| Temp., °F. | Oil Viscosity, cs with 9(a) | with 9(b) | Percent Visc. Incr.** |
|---|---|---|---|
| 0 | 16.3* | 16.8* | 3 |
| 40 | 768.0 | 1302.7 | 69 |
| 100 | 101.7 | 162.0 | 59 |
| 210 | 14.11 | 20.08 | 42 |

*Measured as poises.
**|(9b-9a)/9a| × 100

Thus, the copolymers of this invention provide greater thickening power than the butadiene-styrene copolymer precursor at normal operating conditions encountered in engines, which is desirable for better engine performance and lubricant effectiveness. Yet, surprisingly, at the low temperature or "cold-crank" temperature range, the thickening by the copolymers of this invention actually decreases resulting in easier start-up, whereas the butadiene-styrene copolymer causes increased thickening or more difficult start-up.

DETERGENT PROPERTIES

One test to indicate the ability of an additive to pick up and disperse particles in oil is the carbon removal test:

A stainless steel cylindrical cell is mounted in a constant temperature both of 100°C. Inside the cell is a 400-mesh nickel screen in which nickel powder has been placed as a porous bed. Carbon black is deposited on the bed by passing through the bed 10 cc. of a dispersion of 250 ppm. of carbon black in white oil at 1 cc./min. followed by 5 cc. of white oil alone. A solution of a solvent-refined mineral oil containing 5% by weight of a block copolymer of this invention is passed through the bed at 1 cc./min. Light transmission measurements of the oil compositions before and after passage through the bed conform to Beer-Lambert, indicating the amount of carbon black removed from the bed. The following results were obtained using the block copolymers of this invention as detergent-dispersants:

TABLE IV

| Test No. | Polymer | MW | Wt. %, EO | Percent Removal |
|---|---|---|---|---|
| 1 | Oil alone | — | — | 0 |
| 2 | TBS-EO-OK | 10,000 | 20.0 | 37 |
| 3 | TBS-EO-TDIK | 101,000 | 19.2 | 36 |
| 4 | HBDS-EO-TDIK | 74,000 | 8.4 | 36 |
| 5 | HBDS-EO-OK | 100,000 | 15.0 | 20 |
| 6 | TBS-EO-OH | 10,000 | 10.0 | 52 |
| 7 | TBS-EO-TDIK | 30,000 | 20.0 | 39 |
| 8 | HBDS-EO-TDIK | 82,000 | 30.4 | 38 |
| 9 | TBS-EO-pyrimidine | 10,000 | 10.0 | 9 |
| 10 | TBS-EO-trichloro triazine | 10,000 | 10.0 | 27 |

Two of the copolymers of this invention were tested in a Caterpillar engine as a lubricant additive. The lubricant formulation consisted of 9.75% by weight of other additives including a substantially ashless dispersant, an overbased calcium phenate, a zinc dialkyl phosphorodithioate and an amine and a phenol antioxidants. In the lubricant formulation was present 1.5% by weight of a mixture of copolymers of t-butylstyrene and ethylene oxide capped with TDIK. Both copolymers were prepared in the manner of Examples 1 and 5. The mixture was prepared by mixing 554 grams of copolymer having the following characteristics:

$M_n = 43,000$ $M_w = 72,000$

EO, % wt. = 16.8 with 56 grams of a copolymer of the following characteristics:

$M_w/M_n = 1.5$ $M_n = 58,000$ $M_w = 86,000$

EO, % wt. = 10.0

The engine used was a single cylinder, 4-cycle engine operating under the following conditions:

Speed, rpm. = 1,000

Brake load, HP = 19.8

Oil Temperature, °F. = 150

Jacket Temperature, °F. = 150

Fuel = Diesel fuel containing 1% sulfur

The engine was operated for 240 hours. At the completion of the test, the engine piston and cylinder were examined and rated as follows (on the basis of 0 to 100): piston rating, 100 is perfectly clean; lacquer demerits, 0 means no lacquer; top groove carbon packing, 0 is clean. The results of the test using the above oil formulation are as follows:

| | Oil With Copolymers |
|---|---|
| Piston Rating | 93.8 |
| Lacquer Demerits | 3.8 |
| Top Groove Carbon Packing | less than 1 |

The copolymers of this invention have equally effective detergent characteristics for gasolines and other fuels. Three products were tested along with a commercial complexed polyamine detergent in a carburetor detergency test. A gasoline formulation containing the detergent is used to operate a standard 302 CID Ford V/8 engine containing a modified intake system.

Essentially, the standard air system is replaced by a Y manifold fitted with thermocouples and two aluminum deposit tubes. On each leg of the Y manifold is mounted a single-barrel carburetor fitted with an aluminum sleeve near the throttle plate in the carburetor base. The tubes and sleeves are preweighed. The air inlet is divided to permit the inlet air into each leg of the Y. The inlet air is preheated to 150°F.

The fuel system consists of two 15-gallon tanks, one for each carburetor. The neat or base gasoline is run through one carburetor; the gasoline containing the test additives is run through the second carburetor. In the following runs the treated formulations consist of the base gasoline containing:

1. 35 pounds per 1000 barrels of a copolymer prepared as in Example 1, except that 400 grams of t-butylstyrene was used to form the A-polymer and 100 grams of ethylene oxide (20% EO) was used to form the B-portion of the copolymer. The amount of THF was 3,000 ml. and the amount of cumyl potassium solution was 120 ml. in a 0.415N solution. The resulting copolymer had the following characteristics:

$M_n = 9,000$ $M_w = 11,200$ $M_w/M_n = 1.25$ 2. 50 pounds per 1000 barrels of gasoline of (1) above.
3. 35 pounds per 1000 barrels of gasoline of a copolymer of TBS-EO-TDIK prepared as in Example 1 and Example 5, the resulting copolymer having an $M_n$ of 29,000, $M_w$ of 46,000, $M_w/M_n$ of 1.6 and % EO of 11.9.
4. 35 pounds per 1000 barrels of gasoline of the commercial complex polyamine additive.

The engine test was operated as follows: The engine was started and allowed to warm up, set at 700±50 rpm. Fuel flow is set to 2.9 lbs./hr. on individual flowmeters. A heater attached to each deposit tube in the Y section is set to 350°F. and air heater set to provide preheated air at 150°F. Cooling water out is set at 180°F., oil temperature out at 170°F. Then the engine is set to 2,500±50 rpm. then back to 700±50. These speeds are alternatively changed as follows:

8.5 minutes at 700±50 rpm.
0.5 minutes at 2500±50 rpm.

for a total of 12 hours, the engine is shut down at the end of the 80th cycle. The deposit tubes and carburetor sleeves are removed, heated in an oven at 230°F. for at least 15 minutes, then weighed. The initial weight is subtracted from the new weight and the difference reported as deposits. The sleeves are then washed in normal heptane, again heated and dried and weighed again. The results of deposits on the sleeves and tubes are as follows:

Sleeve Deposit, mg.

| Run | Treated | Base Fuel | % Red. |
|---|---|---|---|
| (1) | 14.1 | 22.6 | 38 |
| (2) | 13.9 | 20.7 | 33 |
| (3) | 8.5 | 15.7 | 46 |
| (4) | — | — | 44 |

Tube Deposit, mg.

| | Unwashed Treated | Base Fuel | % Red. | Washed Treated | Base Fuel | % Red. |
|---|---|---|---|---|---|---|
| (1) | 14.7 | 23.1 | 26 | 5.7 | 22.1 | 74 |
| (2) | 19.6 | 23.3 | 16 | 1.8 | 22.1 | 92 |
| (3) | 112.6 | 24.6 | −(358) | 5.1 | 23.8 | 79 |
| (4) | — | — | — | — | — | 83 |

Thus the copolymers of this invention provide gasoline detergency, even as high as 92% reduction in carburetor deposits, equivalent to commercial fuel detergents.

EXAMPLE 11

In this example, t-butylstyrene is polymerized as in Example 1, except 6 ml. of 1.0 M dipotassium alpha-methylstyrene tetramer solution in THF is the initiator. After one hour, 20 grams (0.90 mole) of ethylene oxide is added to the reaction mixture, and the reaction is allowed to proceed. About 98 grams of polymeric product is precipitated in methanol and separated by filtration. This product is a block copolymer of the BAB type.

Having described our invention in both broad terms and by specific illustrations, which invention is intended to include all obvious modifications thereof, we claim:

1. A copolymer comprising a block copolymer having within its molecular structure at least two segments, segment A being a hydrogenated random diene-styrene copolymer in which from 5 to 70% of total units of Segment A are styrene units and Segment B being selected from the group consisting of a polymerized alkylene oxide and alkylene sulfide Segment B being from 1 to about 50% by weight of final block copolymer.

2. The copolymer of claim 1 wherein said segment B is polymerized ethylene oxide.

3. The copolymer of claim 1 wherein said segment B contains a terminating group $-CH_2-CH_2-Z$ wherein Z is selected from the group consisting of hydroxy; $-OM$ wherein M is an alkali metal; $-OR''$ and

wherein R'' is alkyl of from 1 to about 10 carbon atoms;

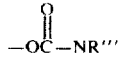

wherein R''' is selected from the group consisting of phenyl, tolyl, phenylene isocyanate, tolylene isocyanate and ionic forms thereof with M; and heterocyclic groups.

4. The copolymer of claim 3 wherein Z is derived from toluene diisocyanate in ionic bond with a metal.

5. The copolymer of claim 3 wherein M is selected from the group consisting of sodium, lithium and potassium.

6. The copolymer of claim 3 wherein the heterocyclic group is selected from the group consisting of pyridines, diazines and triazines.

7. The copolymer of claim 1 wherein the molecular weight of the copolymer is in the range of from 1,000 to 300,000.

8. The copolymer of claim 1 wherein the random butadiene-styrene copolymer is prepared in the presence of a randomizing agent selected from the group consisting of ethers and alkali metal salts of alcohols having from 1 to about 20 carbon atoms and phenols.

9. The copolymer of claim 1 wherein the said copolymer has a formula selected from the group consisting of AB, BAB,

10. The copolymer of claim 9 wherein the formula is AB.

11. The copolymer of claim 9 wherein the formula is BAB.

12. The copolymer of claim 9 wherein segment A is a hydrogenated random butadiene-styrene copolymer and segment B is an ethylene oxide polymer.

13. The copolymer of claim 12 wherein said copolymer is terminated with toluene diisocyanate.

* * * * *